US007388841B2

(12) United States Patent
Shao et al.

(10) Patent No.: US 7,388,841 B2
(45) Date of Patent: Jun. 17, 2008

(54) SELECTING MULTIPLE PATHS IN OVERLAY NETWORKS FOR STREAMING DATA

(75) Inventors: Huai-Rong Shao, Cambridge, MA (US); Zheng Ma, New Haven, CT (US); Chia Shen, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 903 days.

(21) Appl. No.: 10/689,207

(22) Filed: Oct. 20, 2003

(65) Prior Publication Data

US 2005/0083848 A1   Apr. 21, 2005

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)
*H04L 12/56* (2006.01)

(52) U.S. Cl. .................... 370/238; 370/395.21
(58) Field of Classification Search ............ 370/229, 370/230, 230.1, 231, 232, 233, 235, 236, 370/236.1, 238, 252, 254, 255, 256, 257, 370/258, 282; 709/223, 224, 238, 241, 242
See application file for complete search history.

(56) References Cited

U.S. PATENT DOCUMENTS

| 5,933,425 | A   | * | 8/1999  | Iwata            | 370/351 |
|-----------|-----|---|---------|------------------|---------|
| 6,778,502 | B2  | * | 8/2004  | Ricciulli        | 370/238 |
| 6,930,983 | B2  | * | 8/2005  | Perkins et al.   | 370/252 |
| 7,062,548 | B1  | * | 6/2006  | Peres            | 709/223 |
| 2002/0152318 | A1 | * | 10/2002 | Menon et al.    | 709/231 |
| 2003/0088671 | A1 | * | 5/2003  | Klinker et al.  | 709/225 |
| 2004/0255323 | A1 | * | 12/2004 | Varadarajan et al. | 725/25 |

OTHER PUBLICATIONS

D. G. Andersen, H. Balakrishnam, M.F. Kaashoek, and R. Morris, "Resilient overlay networks," in 18th ACM *Symposium on Operation Systems Principles*, 2001.
John Apostolopoulos, Tina Wong, Wai-tian Tan, Susie Wee, "On multiple description streaming with content delivery networks," *IEEE INFOCOM*, 2002.

(Continued)

*Primary Examiner*—Seema S. Rao
*Assistant Examiner*—Christine Duong
(74) *Attorney, Agent, or Firm*—Dirk Brinkman; Clifton D. Mueller; Gene V. Vinokur

(57) ABSTRACT

A method selects multiple paths between a server and a client in an overlay network where nodes are connected by links. The nodes include the server and the client. Each path includes a set of selected links. First, in each node, Quality of service metrics are measured of each link directly connecting the node to an immediate neighboring node. The metrics are transmitted to the server. In the server, a link correlation matrix based on the metrics and a path correlation matrix based on the link correlation matrix are determined. Then, the multiple paths are selected based only on the metrics, the link correlation matrix, and the path correlation matrix.

10 Claims, 2 Drawing Sheets

OTHER PUBLICATIONS

Ali C. Begen, Yucel Altunbasak, and Ozlem Ergun, "Fast Heuristics for multi-path selection for multiple description encoded video streaming," in *IEEE ICME*, 2003.

Ali C. Begen, Yucel Altunbasak, and Ozlem Ergun, "Multi-path selection for multiple description encoded video streaming," in *IEEE ICC*, 2003.

Jian Zhou, Huai-Rong Shao, Chia Shen, Ming-Ting Sun, "Multi-path transport of FGS video," *Packet Video Workshop*, 2003.

S. Lin, Y. Wang, S. Mao, and S. S. Panwar, "Video Transport over Ad Hoc Networks with Path Diversity," Proceedings of The 2002 IEEE International Symposium on Circuit and Systems, Scottdale, Arizona, May 26-29, 2002.

J. G. Apostolopoulos, "Reliable video communication over lossy packet networks using multiple state encoding and path diversity," in *VCIP*, 2001.

Shigang Chen, Klara Nahrstedt, "On finding multi-constrained paths," in *IEEE ICC*, 1998.

Venkata N. Padmanabhan, Helen J. Wang, Philip A. Chou, "Resilient peer-to-peer streaming," Technical Report MSR-TR-2003-11, Microsoft Research, Redmond, WA, Mar. 2003.

Srihari Nelakuditi and Zhi-Li Zhang, "On selection of paths for multipath routing," *IEEE IWQoS*, 2001.

Gang Liu, K.G. Ramakrishnan, "A*Prune: An algorithm for finding K shortest paths subject to multiple constraints," *IEEE INFOCOMM*, 2001.

Thinh Nguyen and Avideh Zakhor, "Path diversity with forward error correction system for packet switched networks," *IEEE INFOCOM*, 2003.

Zheng Wang and Jon Crowcroft, "Quality of service routing for supporting multimedia applications," *IEEE Journal of Selected Areas in Communications*, pp. 1228-1234, vol. 14, No. 7, 1996.

E. W. Zegura, K.L. Calvert and M. J. Donahoo, "A quantitative comparison of graph-based models for Internet topology," IEEE/ACM Trans. Networking, vol. 5, No. 6, pp. 770-783, 1997.

* cited by examiner

100

Step 0. Invalidate all the links in the networks with available bandwidth less than a target streaming rate. Measure QoS metrics of links, and maintain link and path correlation matrices based on the QoS metrics.

Step 1. Find the first shortest path based on the QoS metrics.

Step 2. Update the available bandwidth of each link by previous selected paths. Invalidate links with available bandwidth less than the target streaming rate.

Step 3. Calculate the new correlation cost for each link with respect to the selected links.

Step 4. Use a cost function to combine the path correlation matrix and the QoS metrics into an updated cost for each link.

Step 5. Find the shortest path based on the updated cost.

Repeat step 2 –5 until all required paths are found.

SELECTING MULTIPLE PATHS IN OVERLAY NETWORKS FOR STREAMING DATA

FIELD OF THE INVENTION

This invention relates to communications networks, and more specifically to selecting multiple communication paths for streaming data in heterogeneous networks including physical and overlay networks.

BACKGROUND OF THE INVENTION

It is desired to stream data over the Internet in a reliable and cost effective manner. Typically, the streamed data are a video and/or an audio signal. Streaming data can be characterized by strict delay constraints, and sensitivity to packet losses. The current infrastructure of packet networks, such as the Internet, is insufficient to adequately support streaming applications. The quality of end-to-end streaming can be improved by using special coding techniques, such as multiple description coding (MDC) or fine-granularity-scalability (FGS) coding.

These coding techniques work particularly well when multiple paths are used for the description, see Apostolopoulos, "Reliable video communication over lossy packet networks using multiple state encoding and path diversity," in VCIP, 2001, and Lin et al, "Video Transport over Ad Hoc Networks Using Multiple Paths," Proceedings of The 2002 IEEE International Symposium on Circuit and Systems, May 2002, and Zhou et al., "Multi-path transport of FGS video," Packet Video Workshop, 2003, Begen et al., "Multi-path selection for multiple description encoded video streaming," in IEEE ICC, 2003, and Begen et al., in "Fast Heuristics for multi-path selection for multiple description encoded video streaming," IEEE ICME, 2003.

Content delivery networks (CDN) have been used to provide path diversity for MDC video streaming, see Apostolopoulos et al., "On multiple description streaming with content delivery networks," IEEE INFOCOM, 2002. However, that method requires that videos are pre-stored in edge servers of the network. Edge servers are located near the destination clients. This increases the cost of the streaming.

Prior art path selection usually requires that all links in the selected paths are disjoint. That is, the paths are 'uncorrelated'. However, techniques based on maximally link-disjoint paths severely restrict the number of available paths, and on the average tend to be longer, increasing cost, latency, and packet losses.

SUMMARY OF THE INVENTION

A method selects multiple paths between a server and a client in an overlay network where nodes are connected by links.

The nodes include the server and the client. Each path includes a set of selected links. First, in each node, quality of service metrics are measured for each link directly connecting the node to an immediate neighboring node. The metrics can include bandwidth, latency, and packet loss rate.

The metrics are transmitted to the server. In the server, a link correlation matrix based on the metrics and a path correlation matrix based on the link correlation matrix are determined.

Then, the multiple paths are selected based only on the metrics, the link correlation matrix, and the path correlation matrix. At that point, data can be streamed from the server to the client.

BRIEF DESCRIPTION OF THE DRAWINGS

FIG. 2 is a block diagram of a method for selecting multiple paths in an overlay network according to the invention.

DETAILED DESCRIPTION OF THE PREFERRED EMBODIMENT

Figure 1:
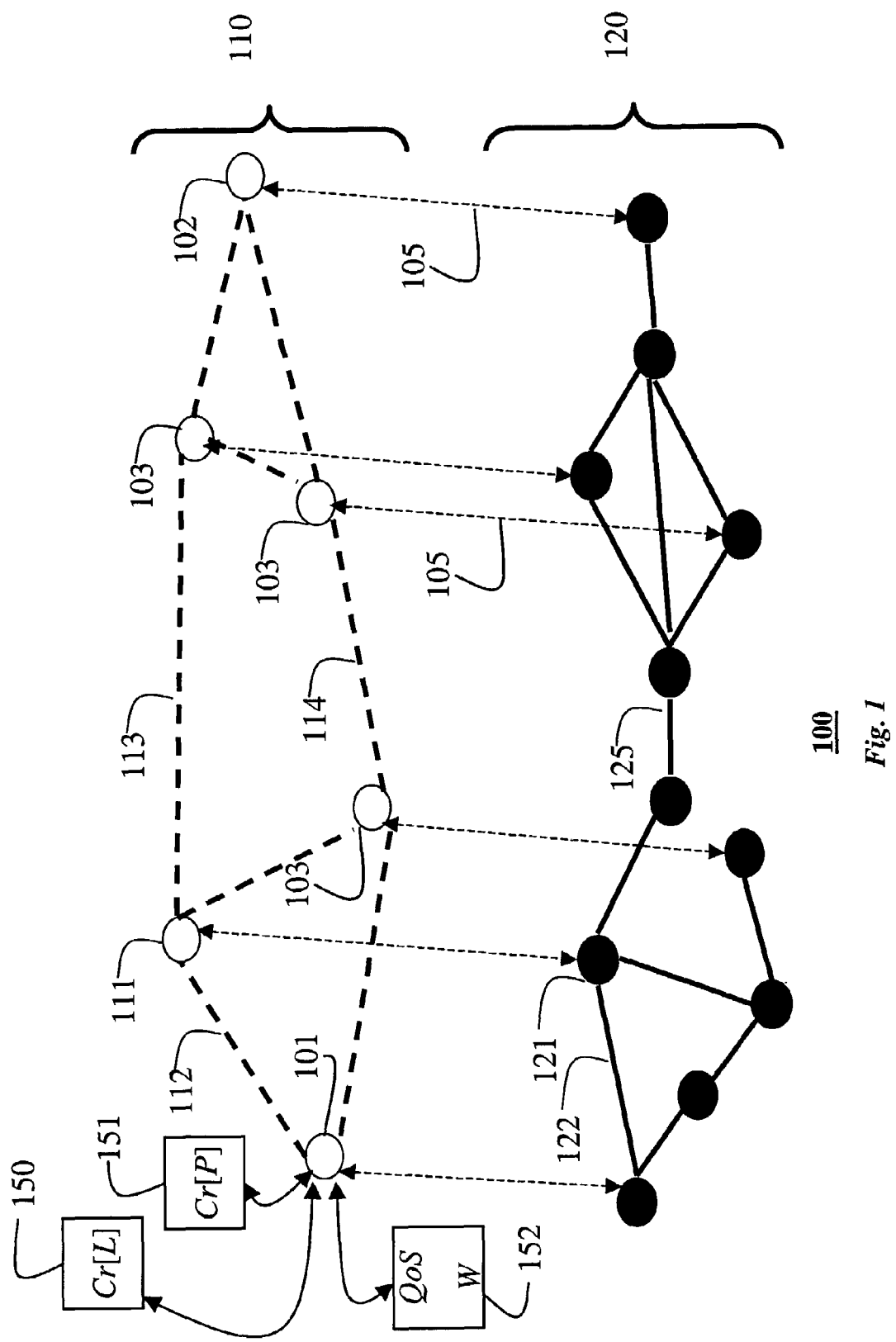
FIG. 1 is a diagram of a heterogeneous network according to the invention.

FIG. 1 shows a heterogeneous network 100 that uses a method for selecting multiple paths for streaming data according to our invention. Our network 100 includes an overlay network 110 and a physical network 120. Overlay nodes 111 of the overlay network, shown as open circles, are connected by overlay links 112, and physical nodes 121 of the physical network, shown as solid circles, are connected by physical links 122.

The overlay network 110 is a virtual network built on top of an existing physical network, e.g., the Internet, see Andersen et al., "Resilient overlay networks," 18$^{th}$ ACM Symposium on Operation Systems Principles, 2001. The vertical lines 105 indicate connections between the nodes of the overlay and physical networks. As an advantage, our overlay network 110 requires minimal support and knowledge of the underlying physical network 120.

The overlay network 110 includes a server node 101 as a source for the data to be streamed, and a client node 102 as a destination for the streamed data. The source and destination nodes are connected by intermediate nodes 103 and the overlay links 112. A set of links that provides a complete end-to-end connection between the server and client is called a path. A number of different paths are possible.

It is an object of the invention to determine multiple optimal paths from the server to the client. It is another object of the invention to maintain such optimal paths dynamically as the network conditions and traffic patterns change over time.

Our overlay network 110 makes minimal assumptions about the knowledge and support of the underlying physical network 120. Periodically, the client 102 makes a request to receive streamed data from the server 101. When the server receives such a request, the server dynamically selects multiple paths to deliver the streamed data the client using paths in the overlay network. By using multiple paths as selected by the invention, the quality of service (QoS) is improved over the prior art.

In the prior art, improved service can be attained by storing a copy of the desired video in servers at the edges of the network. That is, the servers are near the clients. However, videos consume enormous amounts of storage, thus the cost of the overall system is increased dramatically if multiple edge servers are used to store copies of all desired videos. In contrast, the invention only stores one copy of the video at the originating server, no matter how far removed that server is from the client.

According to the invention, each node 111 in the overlay network 110 monitors QoS metrics of the direct links 112 to immediate neighboring nodes, for example, bandwidth, latency, and packet loss rates. These metrics, for each link are forwarded to the server 101. The server uses the metrics to select multiple optimal paths from the server to the client in a dynamic manner, as described in detail below.

The problem with prior art path selection methods is that they require paths with disjoint sets of links. That is, the link cannot be part of more than one overlay path. There are several problems with that selection method. First, the selection is based primarily on network topology as opposed to network condition. This is shown in the example network of FIG. 1. Here overlay links 113-114 are different but they are implemented, in part, by a common link 125. It is not possible to select multiple paths for the network 100 using prior art techniques, such as a maximally link-disjoint path method. Second, that method severely limits the number of paths that can be selected. This has the effect that paths, on the average, tend to be longer and more costly than needed. Longer paths tend to have lower performance.

Our solution to this problem is twofold. First, we use a QoS metric based on both link correlation and path correlation for the multi-path selection problem. Second, we provide a cost function for the link and path correlations to select multiple paths in an optimal manner. Our invention recognizes that many links in the backbone of the physical network have very high bandwidths and are extremely reliable. In fact, the QoS metrics for such links are constantly improving over time. Therefore, in a practical application, it is quite conceivable, and perhaps advantageous to share such a high performance physical link among multiple overlay paths.

Correlation Matrices

In our overlay network 110, the server 101 maintains a link correlation matrix 150 for all links and a path correlation 151 matrix for all paths. The link correlation matrix relates each overlay link to all other overlay links based on QoS metrics 152 also maintained by the server. Similarly, the path correlation matrix relates each possible path to all other possible paths.

Link Correlation

Unlike the prior art, we make no assumptions about a state or topology of the underlying physical network 120. At the server 101, we use statistical information 152 of the links 112 collected by the nodes 111 to define the link and path correlations 150-152. Each node collects metrics about the direct links that connect that node to each immediate neighboring node.

The link correlations (Cr) 150 based on the metrics L are:

$$Cr(L_{ij}, L_{mn}) = 1/2 + \frac{E[(L_{ij} - \bar{L}_{ij})(L_{mn} - \bar{L}_{mn})]}{2\sqrt{E(L_{ij}^2) - (\bar{L}_{ij})^2}\sqrt{E(L_{mn}^2) - (E(\bar{L}_{mn}))^2}}, \quad (1)$$

where ij and mn are a pair of links, E is an expectation for the links. This formula is based on the standard definition for a linear correlation between two random vectors, where the covariance is divided by the variance. Normally, the expectations are in the range [−1, +1]. However, we use a scaled form in equation (1), i.e., (½+½[.]). This guarantees that $0 \leq Cr(L_{ij}, L_{mn}) \leq 1$. The values $L_{ij}$ and $L_{mn}$ are metrics for link ij and link mn. The metric can consider, for example, bandwidth, latency, and packet loss rate. Here, an average of a metric is $\bar{L}_{ij} = E(L_{ij})$.

All the expectations and $Cr(L_{ij}, L_{mn})$ can be measured dynamically and periodically over some time window so that the information 150-152 at the server as always current when paths need to be selected. Furthermore, should network conditions change while the data are streamed, for example, the condition of a path deteriorates, then a better path can be selected so that data are always streamed in a most effective manner.

As stated above, each overlay node probes the links connecting the node to neighboring overlay nodes to obtain the link information 152. This information can be periodically updated and transmitted to the server with usual routing packets. The server sets a time window size and also periodically update the correlation matrices 150-151.

Path Correlation Model

The path correlation matrix 151 is also based on the QoS metrics 152. $Path_A$ and $Path_B$ are two paths in the overlay network with a link set $a \in A$ and a link set $b \in B$. The correlation matrix for these two paths is defined as:

$$Cr(Path_A, Path_B) = \sum_{a \in A} \sum_{b \in B} Cr(a, b) \quad (2)$$

This correlation matrix together with the measured QoS metrics 152, such as latency, packet loss rate and bandwidth, is used to select the multiple paths between the 101 server and the client 102 for streaming data, e.g., a video.

Minimal Correlation Multi-Path Selection Problem

Our path selection method can be formulated as an optimization problem. In the following descriptions, we select two paths. However, it should be understood that more than two paths can be selected using our method.

In our multi-path selection method, the overlay network 110 is represented by a graph G=(V, L), where V is the set of nodes and L is the set of links. Each link $(i, j) \in L$ is associated with R non-negative and additive QoS values $W_r(i,j), r=1,2,\ldots,R$ 152. The additive QoS metric means that a path metric is a summation of the metrics of the set of links L that define the path. Examples of additive QoS metrics are latency, delay jitter, and bandwidth. Some non-additive QoS metric, such as packet loss rate can be transformed to an additive metric using a conventional logarithmic function, see Zheng et al., "Quality of service routing for supporting multimedia applications," IEEE Journal of Selected Areas in Communications, Vol 14, No. 7, pp. 1228-1234, 1996, for details.

In addition, there are R corresponding path QoS constraints Dr, r=1, 2, . . . R, as defined below. A correlation between link (i, j) and (m, n) is defined by equation (1) as $Cr(L_{ij}, L_{mn})$.

We also define link validity indication vectors $X=(\ldots X_{ij} \ldots)$ and $Y=(\ldots Y_{ij} \ldots)$. These vectors indicate whether a link (i,j) is valid in a first path ($X_{ij}=1$), or in a second path ($Y_{ij}=1$).

Then, we minimize $$\sum_{(i,j) \in E} \sum_{(m,n) \in E} X_{ij} \cdot Y_{mn} Cr(L_{ij}, L_{mn}), \quad (3)$$

subject to link validities $$X_{ij} \in \{0,1\}, Y_{mn} \in \{0,1\}, \forall (i,j) \in E,$$

and the following constraints $$\sum_{(i,j) \in E} X_{ij} W_r(i,j) \leq D_r, \forall r = 1, 2, \ldots, R \quad (4)$$

$$\sum_{(i,j) \in E} X_{ij} - \sum_{(j,i) \in E} X_{ji} = \begin{cases} 1, & \text{if } i=s \\ -1, & \text{if } i=d \\ 0, & \text{else} \end{cases} \quad (5)$$

$$\sum_{(m,n) \in E} Y_{mn} - \sum_{(n,m) \in E} Y_{nm} = \begin{cases} 1, & \text{if } m=s \\ -1, & \text{if } m=d \\ 0, & \text{else.} \end{cases} \quad (6)$$

Equation (4) expresses the R different QoS metric constraints W 152, while equations (5) and (6) are link constraints for the first and second path, respectively. In equations (5) and (6), the symbols s and d indicate the server (source node) and client (destination node), respectively.

This minimization is an NP-hard problem. The matrix $C_{|E| \times |E|}$ has $Cr(L_{ij}, L_{mn})$ entries. We can define vectors $$P_{2|E| \times 1} = \begin{pmatrix} X \\ Y \end{pmatrix} \text{ and } D_{2|E| \times 2 \times |E|} = \begin{pmatrix} 0 & C \\ C^T & 0 \end{pmatrix},$$

and change the corresponding constraints so that the minimization objective becomes $$\frac{1}{2} P^T D P,$$

where T denotes an inverse transform in the conventional manner. This is a standard format of well known quadratic programming which is a NP-hard problem.

Multi-Path Selection Method

As shown in FIG. 2, the NP-hardness of our multi-path selection problem requires us to provide a heuristic solution. In step 0, we invalidate all links in the overlay network with available bandwidths that are less than a target streaming rate. We measure the QoS metrics for the links, and construct and maintain the link and path correlation matrices as described above.

In step 1, we first select a 'shortest' path based on predetermined QoS metrics, e.g., latency and packet loss rate.

In step 2, we update the available bandwidth of each link according to previously selected paths. Again, we invalidate any links with a bandwidth less than the target streaming rate.

In step 3, we take into account the correlation between links. Therefore, we determine a correlation cost (cc) for each link L with respect to a previous selected link set S of a path as $$Cr_S^L = \sum_{a \in S} Cr(L, a), \quad (7)$$

where L∈L, and a∈S, as defined above. The correlated cost of link L=(i,j) with the selected set S is a summation of all the pair wise correlation between L and every link in the set S.

Then, in step 4, we combine the correlation cost and the R measured metrics W to obtain a new cost for each link using a cost function $$Cost_S^L = \alpha \cdot Cr_S^L + \sum_{i=1}^{R} \alpha_i W_r(i, j). \quad (8)$$

This cost function is a weighted sum of the path correlation matrix 151 and the metric W 152, where $\alpha$ and $\alpha_i$ are weighting factors.

In step 5, we find a next shortest path based on the usual link metrics, such as bandwidth, latency and packet loss rate. We use the correlation cost as another constraint to determine the next shortest path. To find the one path that satisfies the multiple constraints, we use the cost function of equation (8) that combines the correlation cost and the most important link metrics, such as packet loss rate and latency, using the appropriate weighting factors.

We use the well known Dijkstra algorithm to find the next shortest path according to the new cost. The Dijkstra algorithm is used for link-state routing protocols to help find the shortest path through a mesh of network connections based on the path with the least cost. The algorithm performs a series of calculations that eventually develop the cost of pathways to nodes, and the pathway that has the least cost, in a well known manner.

Because finding a path with multiple constraints is known as a NP-hard problem, we use equation (8) to improve performance. Various approximation algorithms for this problem are also known. We can replace steps 4 and 5 by such known approximations.

Steps 2 through 5 are repeated until all paths have been found.

In a dynamic version of the selection method, all links are reevaluated, and new paths are selected depending on current and dynamic network conditions by repeating with step 0.

EFFECT OF THE INVENTION

The invention provides a multi-path selection method for streaming multiple description coded (MDC) video in an overlay network of the Internet. We provide a QoS metric and link correlation matrix. Based on the link correlation matrix, the invention provides a path correlation matrix for the multi-path selection problem of overlay network. The invention also provides an efficient multi-path selection procedure, called correlation cost routing, to find multiple paths in the overlay network. The invention improves performance by up to 3 dB when compared with prior art maximally link-disjoint paths for streamed MDC video.

The prior art selection method based on maximally link-disjoint paths does not accurately specify the correlation between paths in the overlay network, and thus has a lower PSNR. Our correlation cost routing procedure incorporates both the static and the dynamic correlations between overlay links into the path selection method, and thus, has a better PSNR. Our method allows a link to be used in more than one path and thus, is more likely to meet delay constraint than the maximally link-disjoint paths method. Indeed, our method has a lower packet loss rate due to path diversity, and our method has fewer delayed packets due to shorter path length, and is less complex to implement.

As a most important difference, the prior art first considers the network topology to select viable paths, and only then considers path QoS metrics. In contrast, the invention is entirely based on correlations of QoS metrics of links and paths. Network topology is not a factor.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for selecting multiple paths between a server and a client in an overlay network having a plurality of nodes connected by links, the plurality of nodes including the server and the client, each path including a set of selected links, comprising the steps of:

measuring, in each node of the overlay network, quality of service metrics of each link directly connecting the node to an immediate neighboring node in the overlay network;

transmitting the quality of service metrics to the server;

maintaining, in the server, the quality of service metrics, a link correlation matrix based on the quality of service metrics, and a path correlation matrix based on the link correlation matrix, and in which the link correlation matrix is $$Cr(L_{ij}, L_{mn}) = 1/2 + \frac{E[(L_{ij} - \overline{L}_{ij})(L_{mn} - \overline{L}_{mn})]}{2\sqrt{E(L_{ij}^2) - (\overline{L}_{ij})^2} \sqrt{E(L_{mn}^2) - (E(\overline{L}_{mn}))^2}},$$

where ij and mn are a pair of links connecting two nodes, E is an expected value, $L_{ij}$ and $L_{mn}$ are the quality of service metrics for link ij and link mn, an average $\overline{L}_{ij} = E(L_{ij})$, and an average $\overline{L}_{mn} = E(L_{mn})$; and selecting, in the server, the multiple paths based only on the quality of service metrics, the link correlation matrix, and the path correlation matrix.

2. The method of claim 1, further comprising:

streaming data from the server to the client via the multiple paths.

3. The method of claim 2, further comprising:

storing a copy of the streaming data only at the server.

4. The method of claim 2, in which the streaming data are multimedia.

5. The method of claim 1, in which the quality of service metrics include bandwidth, latency, and packet loss rate of the link.

6. The method of claim 1, in which the measuring, transmitting, maintaining, and selecting are performed dynamically and periodically over a time window.

7. The method of claim 1, in which the path correlation matrix is $$Cr(Path_A, Path_B) = \sum_{a \in A} \sum_{b \in B} Cr(a, b),$$

where the $path_A$ includes a link set $a \in A$ and the $path_B$ includes a link set $b \in B$.

8. The method of claim 7, further comprising:

first selecting a first path based on the quality of service metrics;

updating an available bandwidth of each link according to previously selected paths;

determining a correlation cost (cc) for each link L with respect to a previous selected link set S of a path as $$Cr_S^L = \sum_{a \in S} Cr(L, a);$$

combining the correlation cost and the quality of service metrics to obtain a cost for each link using a cost function $$Cost_S^L = \alpha \cdot Cr_S^L + \sum_{i=1}^{R} \alpha_i W_r(i, j),$$

where $W_r$ is the quality of service metrics, and $\alpha$ and $\alpha_i$ are weighting factors; and selecting a next shortest path based on the updated cost $Cost_S^L$; and repeating the updating, determining, combining, and selecting until the plurality of paths have been selected.

9. The method of claim 1, in which the link correlation matrix relates each link to all other links based on the quality of service metrics.

10. The method of claim 1, in which the path correlation matrix relates each possible path to all other possible paths.

* * * * *